(12) United States Patent
Young et al.

(10) Patent No.: US 11,989,958 B2
(45) Date of Patent: May 21, 2024

(54) FOOD STORAGE SYSTEM, METHOD AND COMPUTER READABLE MEDIUM

(71) Applicant: BREVILLE USA, INC., Torrance, CA (US)

(72) Inventors: Christopher Charles Young, Torrance, CA (US); Douglas Baldwin, Torrance, CA (US); Kent Michael Harper, Jr., Torrance, CA (US); Edward Starbird, Torrance, CA (US)

(73) Assignee: BREVILLE USA, INC., Torrance, CA (US)

( * ) Notice: Subject to any disclaimer, the term of this patent is extended or adjusted under 35 U.S.C. 154(b) by 399 days.

(21) Appl. No.: 17/425,247

(22) PCT Filed: Jan. 24, 2020

(86) PCT No.: PCT/IB2020/050552
§ 371 (c)(1),
(2) Date: Jul. 22, 2021

(87) PCT Pub. No.: WO2020/152634
PCT Pub. Date: Jul. 30, 2020

(65) Prior Publication Data
US 2022/0092877 A1    Mar. 24, 2022

Related U.S. Application Data

(60) Provisional application No. 62/796,997, filed on Jan. 25, 2019.

(51) Int. Cl.
*G06T 7/00*    (2017.01)
*G06K 7/14*    (2006.01)
(Continued)

(52) U.S. Cl.
CPC ........... *G06V 20/68* (2022.01); *G06K 7/1417* (2013.01); *G06Q 10/087* (2013.01); *G06T 7/70* (2017.01); *G06V 20/64* (2022.01)

(58) Field of Classification Search
CPC ...... G06V 20/68; G06V 20/64; G06K 7/1417; G06K 19/06037; G06K 19/07;
(Continued)

(56) References Cited

U.S. PATENT DOCUMENTS 9,436,771 B1 * 9/2016 Caragol ............. G06F 16/9554
2013/0138656 A1 * 5/2013 Wheaton ................ G06Q 30/06
709/219

(Continued)

FOREIGN PATENT DOCUMENTS

DE   10 2017 206 552 A1   10/2018
WO      2017/059480 A1    4/2017

OTHER PUBLICATIONS

Hassannejad, "A New Approach to Image-Based Estimation of Food Volume", Algorithms, 2017, vol. 10, No. 66 Section 2 (Year: 2017).*

(Continued)

*Primary Examiner* — Ping Y Hsieh
(74) *Attorney, Agent, or Firm* — KDW FIRM PLLC

(57) ABSTRACT

Systems and methods for sharing data about the contents of storage bags or containers with external devices are described herein. In several embodiments, a food storage system can operate to track/record data about the contents in multiple storage bags and to allow for the identification of the contents in the storage bags based on a unique identifier associated with the storage bags. In some embodiments, the food storage system can provide reminders, recommendations, or other prompts regarding the contents in the storage bags.

20 Claims, 7 Drawing Sheets

(51) Int. Cl.
  *G06Q 10/087*  (2023.01)
  *G06T 7/70*   (2017.01)
  *G06V 20/64*  (2022.01)
  *G06V 20/68*  (2022.01)

(58) Field of Classification Search
  CPC ........ G06Q 10/087; G06Q 10/08; G06T 7/70; B65D 85/70; G09F 2003/0216; H04L 12/2823
  See application file for complete search history.

(56) References Cited

U.S. PATENT DOCUMENTS

2016/0335588 A1* 11/2016 Knobel ............ G06K 19/06028
2018/0196401 A1* 7/2018 Lagares-Greenblatt ..................... G05B 19/042

OTHER PUBLICATIONS

Hassannejad et al., "A New Approach to Image-Based Estimation of Food Volume," *Algorithms*. 10(2):1-14, 2017.

Hassannejad et al., "Automatic diet monitoring: a review of computer Vision and wearable sensor-based methods," *International Journal of Food Sciences and Nutrition*. 68(6):656-670, 2017.

Puri et al., "Recognition and Volume Estimation of Food Intake using Mobile Device," *Workshop on Applications of Computer Vision Conference*, Snowbird, Utah, USA, Dec. 7-8, 2009, pp. 1-8.

International Search Report and Written Opinion, dated Mar. 3, 2020, for International Application No. PCT/IB2020/050552, 10 pages.

The Extended European Search Report dated Sep. 13, 2022, for Application No. 20745955.3 (seven (7) pages).

\* cited by examiner

FOOD STORAGE SYSTEM, METHOD AND COMPUTER READABLE MEDIUM

RELATED APPLICATION

This application claims priority from U.S. Provisional Patent Application 62/796,997, filed 25 Jan. 2019, the contents of which is herein incorporated by reference in its entirety.

BACKGROUND

Food items are often placed in containers or bags for storage in a freezer, refrigerator, pantry, cabinet, etc. For example, people often have many food items distributed among different bags in their freezer. The bags may contain sauces, proteins (e.g., fish, chicken, steak, etc.), marinades, vegetables, cooking stocks, combinations thereof, etc. However, it can be difficult to determine or remember what bags contain what food items—particularly when a food item is frozen within a sealed bag. Moreover, because food items can be frozen for extended periods, people may easily forget that they have certain food items stored within their freezer.

SUMMARY

It is an object of the present invention to substantially overcome or at least ameliorate one or more disadvantages of existing arrangements.

In one aspect there is provided a food storage system, comprising: at least one processor; and at least one non-transitory processor-readable medium storing processor-executable instructions that, when executed by the at least one processor, cause the at least one processor to: receive, from a user device, data related to a storage bag that uniquely identifies the storage bag; receive, from the user device, data related to contents of the storage bag; associate the data related to the storage bag with the data related to the contents of the storage bag; generate a notification based on the data related to the contents of the storage bag; and send the notification to the user device.

In certain embodiments, the at least one processor is configured to generate the notification to be indicative of: a cooking recommendation based on the data related to the contents of the storage bag; and/or a consumption recommendation based on the data related to the contents of the storage bag.

In certain embodiments, the data related to the storage bag is indicative of a machine readable identifier printed on or affixed to the storage bag, wherein the machine-readable identifier is a unique identifier.

In certain embodiments, the at least one processor is configured to: receive, from the user device, a query request indicative of data uniquely identifying the storage bag having the contents stored therein; query a data store using the data uniquely identifying the storage bag to determine the contents of the storage container; and send, to the user device, data indicative of the contents of the storage container.

In certain embodiments, the at least one processor is configured to: receive, from the user device, input data in relation to the contents of the storage bag; determine, based on the input data, a notification send date to send the notification to the user device; and schedule transfer of the notification to the user device on the notification send date.

In certain embodiments, the at least one processor is configured to receive, from a computing device of a storage device which stores therein the storage bag, temperature data indicative of a storage temperature for the storage bag, wherein the notification send data is determined by the at least one processor further based on the temperature data.

In certain embodiments, the storage device is a refrigerator or freezer.

In certain embodiments, the storage bag has indicia printed or affixed to an external surface thereof, wherein the at least one processor is configured to: receive image data indicative of the indicia of the storage bag whilst containing the contents; process the image data to determine a location or distortion of the indicia in three-dimensional (3D) space; determine one or more characteristics of the contents based at least in part on the location or distortion of the indicia; and determine the send notification date further based on the one or more characteristics of the contents of the storage bag.

In certain embodiments, the at least one processor is configured to process the image data using a computer-vision algorithm.

In certain embodiments, the one or more characteristics include at least one of a weight, a thickness, a volume, a shape, and/or a food type, wherein the contents of the storage bag is one or more food items.

In a second aspect there is provided a system comprising: the food storage system of the first aspect; and the storage bag.

In a third aspect there is provided a method for operating a food storage system, wherein the method includes: receiving, from a user device, data related to a storage bag that uniquely identifies the storage bag; receiving, from the user device, data related to contents of the storage bag; associating the data related to the storage bag with the data related to the contents of the storage bag; generating a notification based on the data related to the contents of the storage bag; and sending the notification to the user device.

In certain embodiments, the method further comprises generating the notification to be indicative of: a cooking recommendation based on the data related to the contents of the storage bag; and/or a consumption recommendation based on the data related to the contents of the storage bag.

In certain embodiments, the data related to the storage bag is indicative of a machine readable identifier printed on or affixed to the storage bag, wherein the machine-readable identifier is a unique identifier.

In certain embodiments, the method further comprises: receiving, from the user device, a query request indicative of data uniquely identifying the storage bag having the contents stored therein; querying a data store using the data uniquely identifying the storage bag to determine the contents of the storage container; and sending, to the user device, data indicative of the contents of the storage container.

In certain embodiments, the method further comprises: receiving, from the user device, input data in relation to the contents of the storage bag; determining, based on the input data, a notification send date to send the notification to the user device; and scheduling transfer of the notification to the user device on the notification send date.

In certain embodiments, the method further comprises receiving, from a computing device of a storage device which stores therein the storage bag, temperature data indicative of a storage temperature for the storage bag, wherein the notification send data is determined by the at least one processor further based on the temperature data.

In certain embodiments, the storage device is a refrigerator or freezer.

In certain embodiments, the storage bag has indicia printed or affixed to an external surface thereof, wherein the method further comprises: receiving image data indicative of the indicia of the storage bag whilst containing the contents; processing the image data to determine a location or distortion of the indicia in three-dimensional (3D) space; determining one or more characteristics of the contents based at least in part on the location or distortion of the indicia; and determining the send notification date further based on the one or more characteristics of the contents of the storage bag.

In certain embodiments, the method further comprises processing the image data using a computer-vision algorithm.

In certain embodiments, the one or more characteristics include at least one of a weight, a thickness, a volume, a shape, and/or a food type, wherein the contents of the storage bag comprises one or more food items.

In a fourth aspect there is provided one or more non-transitory processor-readable mediums storing processor-executable instructions that, when executed by the at least one processor, configure the at least one processor to: receive, from a user device, data related to a storage bag that uniquely identifies the storage bag; receive, from the user device, data related to contents of the storage bag; associate the data related to the storage bag with the data related to the contents of the storage bag; generate a notification based on the data related to the contents of the storage bag; and send the notification to the user device.

In certain embodiments, the one or more non-transitory processor-readable mediums further comprise executable instructions which configure the at least one processor to generate the notification to be indicative of: a cooking recommendation based on the data related to the contents of the storage bag; and/or a consumption recommendation based on the data related to the contents of the storage bag.

In certain embodiments, the data related to the storage bag is indicative of a machine readable identifier printed on or affixed to the storage bag, wherein the machine-readable identifier is a unique identifier.

In certain embodiments, the one or more non-transitory processor-readable mediums comprise of further executable instructions which configure the at least one processor to: receive, from the user device, a query request indicative of data uniquely identifying the storage bag having the contents stored therein; query a data store using the data uniquely identifying the storage bag to determine the contents of the storage container; and send, to the user device, data indicative of the contents of the storage container.

In certain embodiments, the one or more non-transitory processor-readable mediums comprise of further executable instructions which configure the at least one processor to: receive, from the user device, input data in relation to the contents of the storage bag; determine, based on the input data, a notification send date to send the notification to the user device; and schedule transfer of the notification to the user device on the notification send date.

In certain embodiments, the one or more non-transitory processor-readable mediums comprise of further executable instructions which configure the at least one processor to receive, from a computing device of a storage device which stores therein the storage bag, temperature data indicative of a storage temperature for the storage bag, wherein the notification send data is determined by the at least one processor further based on the temperature data.

In certain embodiments, the storage bag has indicia printed or affixed to an external surface thereof, wherein the one or more non-transitory processor-readable mediums comprise further executable instructions which configure the at least one processor to: receive image data indicative of the indicia of the storage bag whilst containing the contents; process the image data to determine a location or distortion of the indicia in three-dimensional (3D) space; determine one or more characteristics of the contents based at least in part on the location or distortion of the indicia; and determine the send notification date further based on the one or more characteristics of the contents of the storage bag.

In certain embodiments, the one or more non-transitory processor-readable mediums comprise further executable instructions which configure the at least one processor is configured to process the image data using a computer-vision algorithm.

In certain embodiments, the one or more characteristics include at least one of a weight, a thickness, a volume, a shape, and/or a food type, wherein the contents of the storage bag comprises one or more food items.

In a fifth aspect there is provided a food storage system, comprising: at least one processor; and at least one non-transitory processor-readable medium storing processor-executable instructions that, when executed by the at least one processor, cause the at least one processor to: receive, from a user device, data related to a storage container that uniquely identifies the storage container, wherein the data that uniquely identifies the storage container is obtained from at least one machine-readable symbol printed on the storage container or printed on a label affixed to the storage container; receive, from the user device, data related to contents of the storage container; and associate the data related to the storage bag with the data related to the contents of the storage container.

In a sixth aspect there is provided a system comprising the food storage system of the fifth aspect and the storage container.

In a seventh aspect there is provided a method of operating a food storage system, comprising steps of: receiving, from a user device, data related to a storage container that uniquely identifies the storage container, wherein the data that uniquely identifies the storage container is obtained from at least one machine-readable symbol printed on the storage container or printed on a label affixed to the storage container; receiving, from the user device, data related to contents of the storage container; and associating the data related to the storage bag with the data related to the contents of the storage container.

In an eighth aspect there is provided one or more non-transitory processor-readable mediums storing processor-executable instructions that, when executed by at least one processor, configure the at least one processor to: receive, from a user device, data related to a storage container that uniquely identifies the storage container, wherein the data that uniquely identifies the storage container is obtained from at least one machine-readable symbol printed on the storage container or printed on a label affixed to the storage container; receive, from the user device, data related to contents of the storage container; and associate the data related to the storage bag with the data related to the contents of the storage container.

Other aspects and embodiments will be appreciated throughout the description of the one or more preferred embodiments.

BRIEF DESCRIPTION OF THE DRAWINGS

Example embodiments should become apparent from the following description, which is given by way of example only, of at least one preferred but non-limiting embodiment, described in connection with the accompanying figures. The components in the drawings are not necessarily to scale. Instead, emphasis is placed on clearly illustrating the principles of the present disclosure.

DETAILED DESCRIPTION

Aspects of the present disclosure are directed generally toward systems and methods for sharing with external devices data about the contents of storage bags or containers. In several of the implementations described below, a food storage system can operate to track/record data about the contents of storage containers (e.g., rigid vessels) or storage bags (e.g., plastic pouches) to allow for users to identify the contents therein. In a particular implementation, a user can scan a QR code or other machine-readable identifier on a storage bag or capture an image of the storage bag using a user device (e.g., mobile phone or tablet) at the time he or she packages a food item into the storage bag. The user can also provide information about the food item, such as what the food item is, how big it is, what it is marinated in, etc. The QR code or image can uniquely identify the storage bag so that, at a later date, the user can rescan or capture another image of the storage bag to retrieve the information about the food item. In some implementations, the food storage system can provide reminders, recommendations, or other prompts regarding using (e.g., cooking) the contents in the storage containers or bags. In some implementations, at least some of the reminders, recommendations or other prompts regarding the food item in the storage containers or bags are provided prior to use (e.g. cooking, consumption, etc.).

In the following detailed description, specific details are set forth to provide an understanding of the present technology. However, the present technology may be practiced without some of these specific details. In some instances, well-known structures and techniques have not been shown in detail so as not to obscure the present technology. The terminology used in the description presented below is intended to be interpreted in its broadest reasonable manner, even though it is being used in conjunction with a detailed description of certain specific embodiments of the disclosure. For example, while certain aspects of the operation of the systems and methods are described in the context of storage bags for use in storing food products within a freezer, the present technology is applicable to many different types of food storage items (e.g., rigid or semi-rigid containers) that may be intended for storage in many different types of environments (e.g., in a refrigerator, cabinet, pantry, etc.). Certain terms may even be emphasized below; however, any terminology intended to be interpreted in any restricted manner will be overtly and specifically defined as such in this Detailed Description section.

The headings provided herein are for convenience only and do not necessarily affect the scope of the embodiments.

I. Selected Embodiments of Suitable Computing Environments

Figure 1:
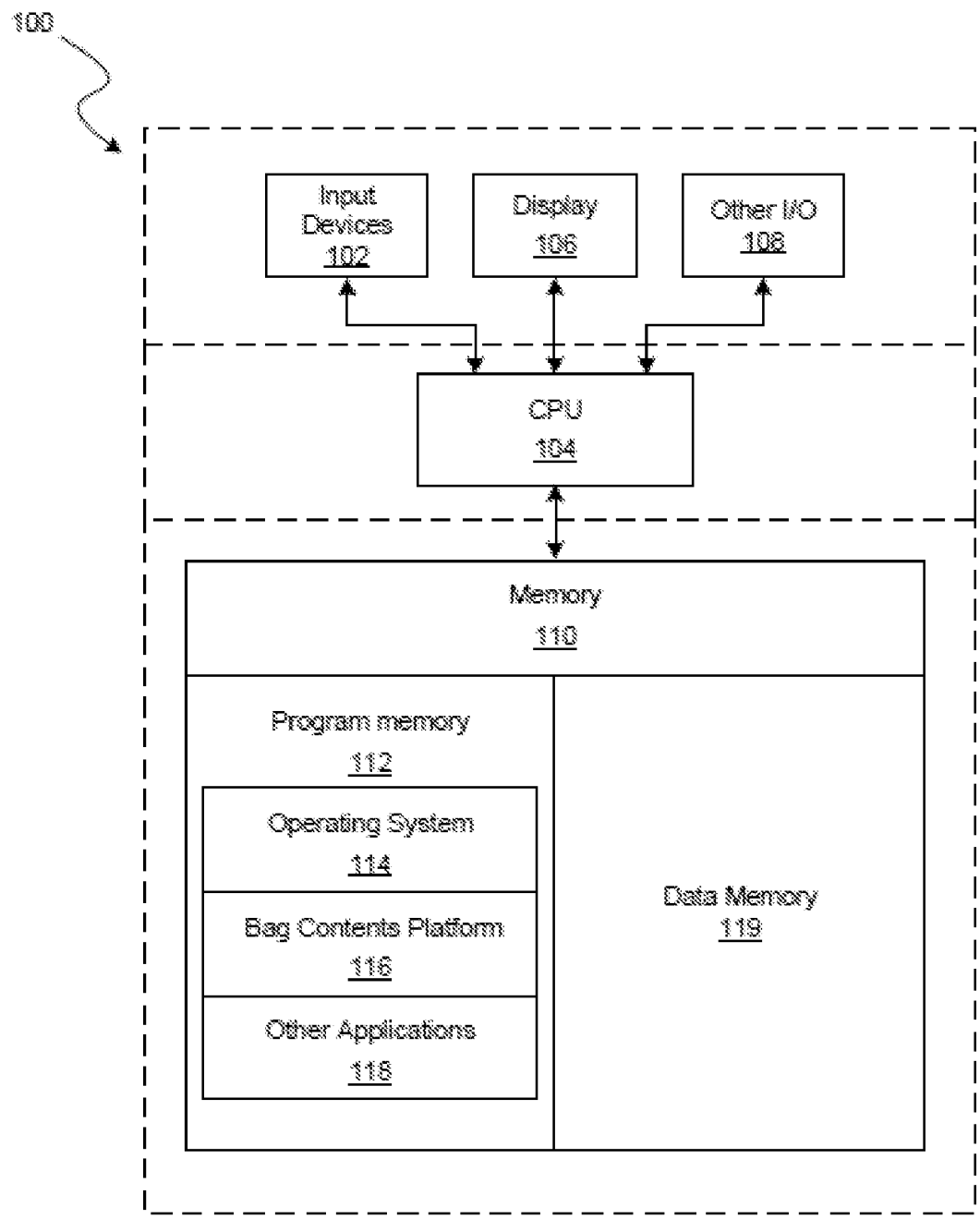
FIG. 1 is a block diagram of an example of a user device on which some implementations of the disclosed technology can operate.
Figure 2:
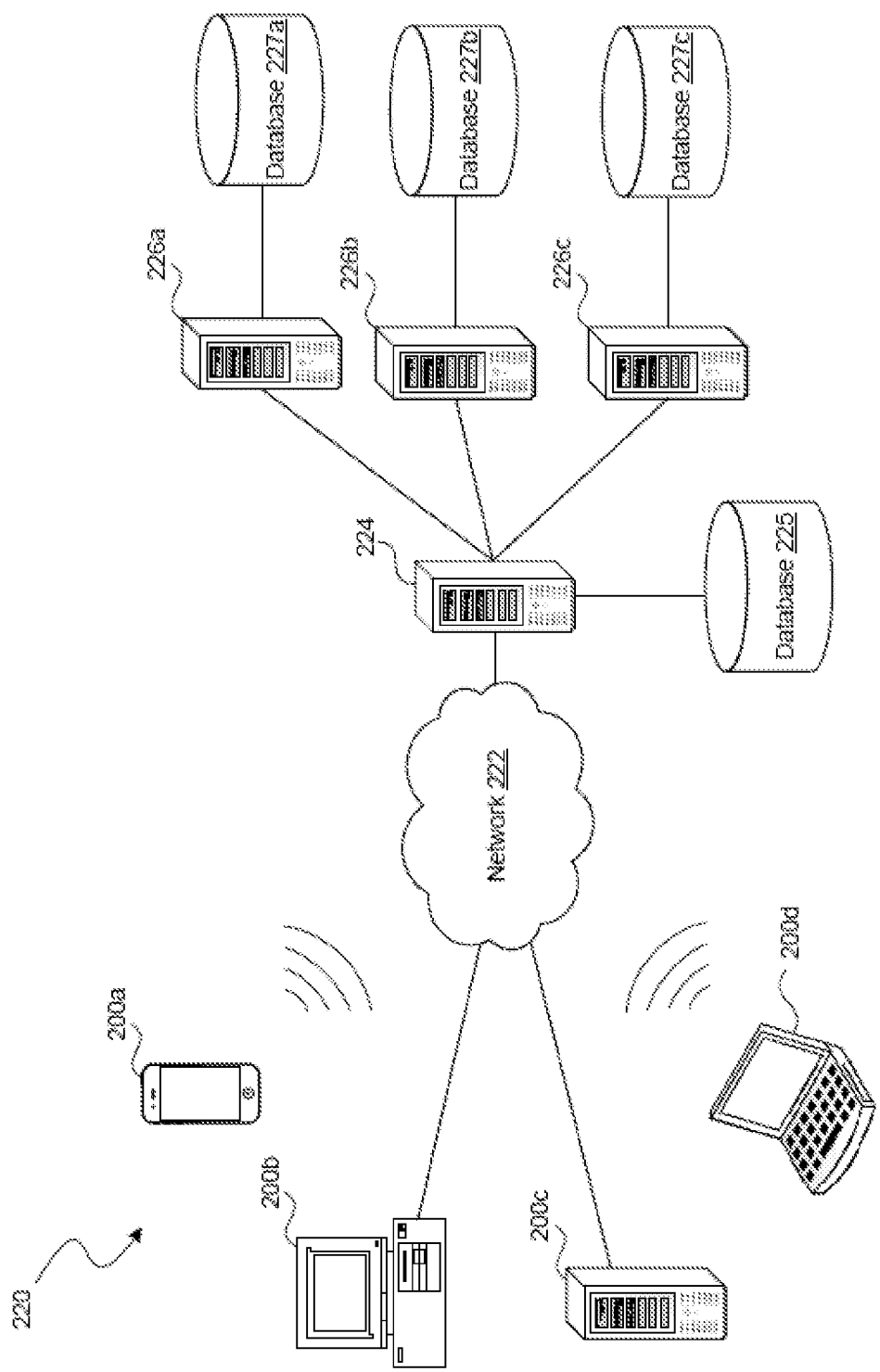
FIG. 2 is a block diagram of an example of a distributed computing environment in which some embodiments of the disclosed technology can operate.

FIGS. 1 and 2 and the following discussion provide a brief, general description of suitable computing environments in which aspects of inventive systems and methods for sharing information/data about storage container contents with external devices can be implemented. The present technology can be embodied as special-purpose hardware (e.g., circuitry), as programmable circuitry appropriately programmed with software and/or firmware, or as a combination of special-purpose and programmable circuitry. Hence, embodiments of the present technology can include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The present technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Aspects of the technology described above may be stored or distributed on computer-readable media or aspects of the invention may be distributed electronically over the Internet or other networks (including wireless networks). Those skilled in the relevant art will recognize that portions of the invention may reside on a server computer, while corresponding portions reside on a client/user computer. Data structures and transmission of data particular to aspects of the invention are also encompassed within the scope of the invention.

FIG. 1 is a block diagram of a user device 100, on which some implementations of the disclosed technology can operate. The user device 100 can be a smartphone, tablet, or personal computer. The user device 100 can include one or more input devices 102 that provide input to a CPU (one or more processors) 104, notifying it of actions. The actions are typically mediated by a hardware controller that interprets the signals received from the input devices 102 and communicates the information to the CPU 104 using a communication protocol. The input devices 102 can include, for example, a mouse, a keyboard, a touchscreen, an infrared sensor, a touchpad, a wearable input device, a camera- or image-based input device, a microphone, and/or other user input devices.

The CPU 104 can be a single processing unit or multiple processing units in a device or distributed across multiple devices. The CPU 104 can be coupled to other hardware devices, for example, with the use of a bus, such as a PCI bus or SCSI bus. The CPU 104 can communicate with a hardware controller for devices, such as for a display 106. The display 106 can be used to display text and graphics. In some examples, the display 106 provides graphical and textual visual feedback to a user. In some implementations, the display 106 includes one or more of the input devices 102 as part of the display, such as when the input devices 102 include a touchscreen or an eye direction monitoring system. The display 106 can be separate from the input devices 102. Examples of display devices include: an LCD screen, an LED display screen, a projected, holographic, or augmented reality display (such as a heads-up display device or a head-mounted device), etc. Other I/O devices 108 can also be coupled to the processor, such as a network card, video card, audio card, USB, FireWire or other type of external device, camera, printer, speakers, CD-ROM drive, DVD drive, disk drive, or Blu-Ray device.

The user device 100 can also include a communication device (e.g., a wireless transceiver) capable of communicating wirelessly or wire-based with a network node. The communication device can communicate with another device or a server through a network using, for example, TCP/IP protocols. The user device 100 can utilize the communication device to distribute operations across multiple network devices.

The CPU 104 can have access to a memory 110. The memory 110 can include one or more of various hardware devices for volatile storage, non-volatile storage, or both, and can include both read-only and writable memory. For example, the memory 110 can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. The memory 110 is not a propagating signal divorced from underlying hardware and is thus non-transitory. The memory 110 can include a program memory 112 that stores programs and software, such as an operating system 114, a storage bag contents identification, tracking, reminder, and recommendation platform 116, and other application programs 118 (e.g., including a predictive cooking platform). As described in greater detail below, the memory 110 can also include a data memory 119 that can store information about one or more storage bags and contents (e.g., food items) within the storage bags. The information in the data member 119 can be received from/captured by the input devices 102 and/or the other I/O devices 108, and can be provided to the program memory 112 or any element of the user device 100.

Some embodiments of the present technology can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and the like.

More specifically, FIG. 2 is a block diagram of a distributed computing environment 220, in which some embodiments of the disclosed technology can operate. The environment 220 can include one or more user devices 200 (identified individually as user devices 200a-200d), examples of which can include the user device 100 described in detail above concerning FIG. 1. The user devices 200 can operate in a networked environment using logical connections through a network 222 to one or more remote computers. In the illustrated embodiment, for example, the user devices 200 are communicatively coupled to a remote server computing device 224 via the network 222.

The server computing device 224 can be an edge server that receives client/user requests and coordinates fulfillment of those requests through other servers, such as server computing devices 226 (identified individually as server computing devices 226a-226c). The server computing devices 224 and 226 can comprise computing systems, such as the user device 100. In the illustrated embodiment, each of the server computing devices 224 and 226 is displayed logically as a single server. Alternatively, some or all of the server computing devices 224 and 226 can be a distributed computing environment encompassing multiple computing devices located at the same or at geographically disparate physical locations. In some embodiments, each of the server computing devices 226 corresponds to a group of servers.

The user devices 200 and server computing devices 224 and 226 can each act as a server or client to other server/client devices. The server computing device 224 can connect to a database 225, and the server computing devices 226a-226c can each connect to a corresponding database 227a-227c, respectively. As discussed above, each of the server computing devices 226 can correspond to a group of servers, and each of these servers can share a database or can have their own database. As described in greater detail below, the databases 225 and 227 can warehouse (e.g., store) information, such as captured/received information about one or more storage bags and the contents of the storage bags. In the illustrated embodiment, the databases 225 and 227 are displayed logically as single units. Alternatively, the databases 225 and 227 can each be a distributed computing environment encompassing multiple computing devices, and can be located within their corresponding server or can be located at the same or at geographically disparate physical locations.

The network 222 can be a local area network (LAN) or a wide area network (WAN), but can also be other wired or wireless networks. The network 222 may be the Internet or some other public or private network. The user devices 200 can be connected to the network 222 through a network interface, such as by wired or wireless communication. While the connections between the server computing devices 224 and 226 are shown as separate connections, these connections can be any kind of local, wide area, wired, or wireless network, including the network 222 or a separate public or private network.

II. Selected Embodiments of Suitable Storage Bags

Figure 3:
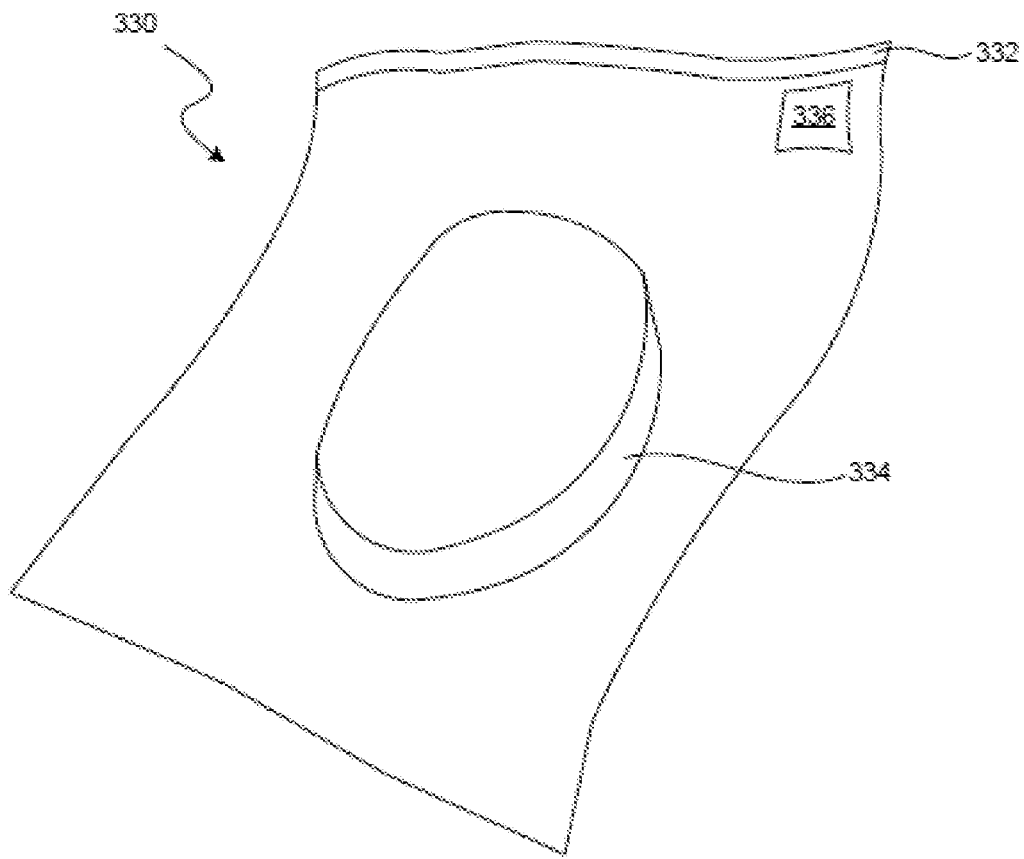
FIG. 3 is a perspective view of an example of a storage bag with a food item disposed therein.

FIG. 3 is a perspective view a storage bag 330 with a food item 334 disposed therein. In the illustrated embodiment, the storage bag 330 is a plastic bag or pouch including a sealing member 332 such as, for example, a single-press zip seal, a multiple-press zip seal, or an adhesive strip (initially covered with a peel away strip before bag closing), or other sealing member known in the art. A user can unseal the sealing member 332 to position the food item 334 within the storage bag 330 and then reseal the sealing member 332 to provide a fluid-tight and/or air-tight seal before storing the storage bag 330 and food item 334 in a refrigerator, freezer, or other suitable location. The bag 330 can be formed of a clear, opaque, or non-clear plastic material (e.g., a polymer or laminated film). In the illustrated embodiment, the bag 330 has a generally rectangular shape while, in other embodiments, the bag 330 can have other shapes (e.g., circular, rectilinear, oval, polygonal, triangular, etc.).

The food item 334 could include one or more of proteins (e.g., fish, steak, etc.), sauces, marinades, vegetables, cooking stocks, etc. In some embodiments, the storage bag 330 can be a sous vide bag configured to be submerged in a water bath during a sous vide cooking process. For example, the storage bag 330 can the same as or similar to any of the sous vide bags described in detail in U.S. Provisional Patent Application No. 62/738,786, filed 28 Sep. 2018, and titled "SOUS VIDE POUCHES AND SYSTEMS AND METHODS FOR TRACKING SOUS VIDE POUCHES," and International Patent Application No. PCT/IB2019/058210, filed 27 Sep. 2019, and titled "SOUS VIDE POUCH, ASSEMBLY, SYSTEM AND METHOD" are both incorporated herein by reference in their entirety.

Alternatively, the storage bag 330 can be a vacuum bag including a vacuum port (not shown), or can be a vacuum bag that omits the sealing member 332 and is configured to be evacuated and sealed by an external vacuum-sealer machine that heat seals bags to fuse opposing bag surfaces (often after removing most air from the bag). For example, the material for the storage bag 330 can be provided as a continuous open tube of material, positioned on a roll, and that can be custom cut and sealed by the user (e.g., using the external vacuum-sealer machine).

As further shown in FIG. 3, a code/identifier 336 can be preprinted on or otherwise affixed to a first (i.e. top) surface of the storage bag 330. The identifier 336 can be printed directly on the storage bag 330 using an ink intended for use at low and high temperatures (e.g., a low migration ink). Alternatively, the identifier 336 can be a sticker that a user can attach to the storage bag 330 such as, for example, after the user has custom cut and sealed the storage bag 330 from a roll of material. In yet another alternative, the user can print the identifier 336 on the storage bag 330 using a printer.

The identifier 336 can be any of various types of bar codes (read in a linear fashion), any of various codes read in two dimensions such as a QR code, electromagnetically readable identifiers such as a Radio Frequency Identifier (RFID), or other automatically readable identifiers that are scannable/readable by a user device (e.g., readable via a camera and an application running on a mobile phone or tablet) for uniquely identifying the storage bag 330. As described in detail below, in some embodiments scanning or imaging the identifier 336 can automatically open an application running on the user device, and the user can enter information about the food item 334 into the user device for associating the food item 334 with the storage bag 330.

Figure 4A:
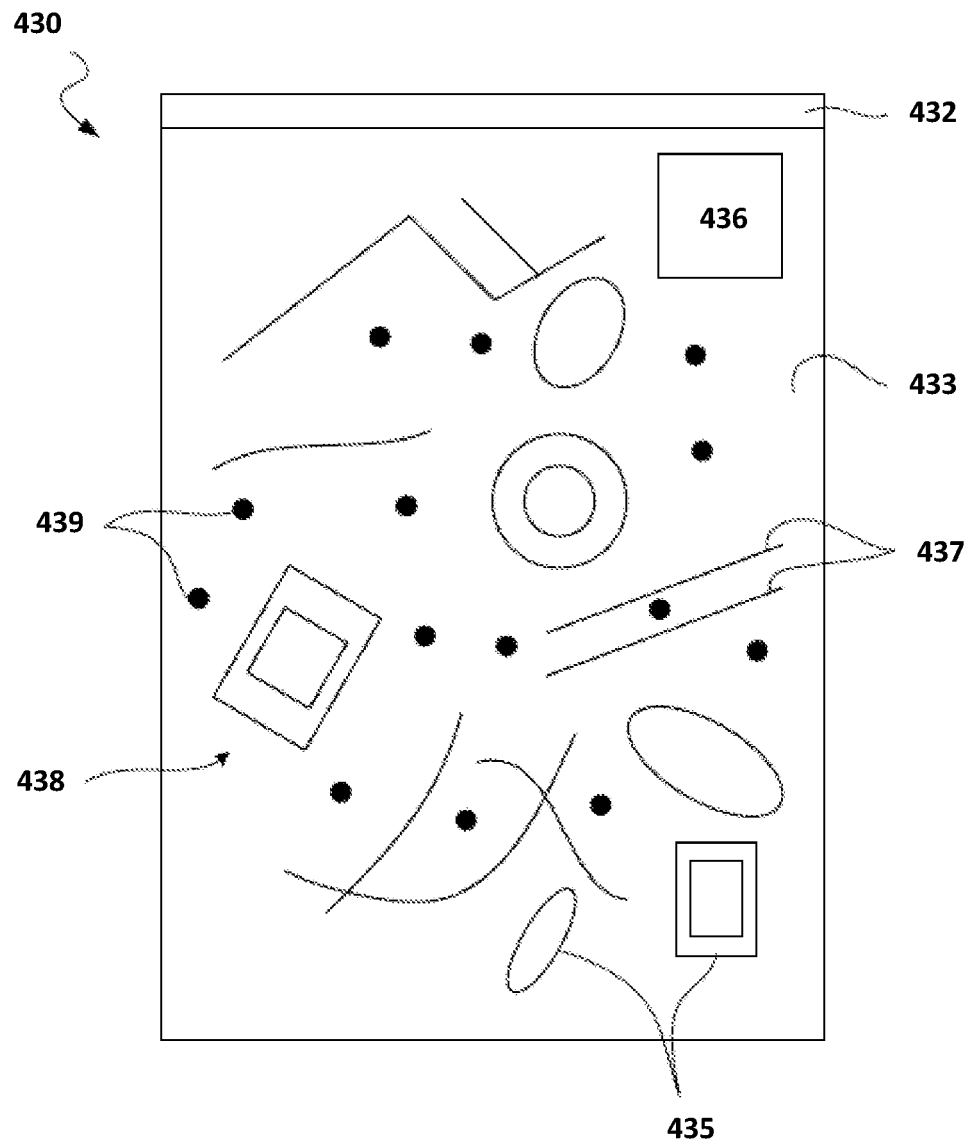
FIG. 4A is a front view of an example of a storage bag.
Figure 4B:
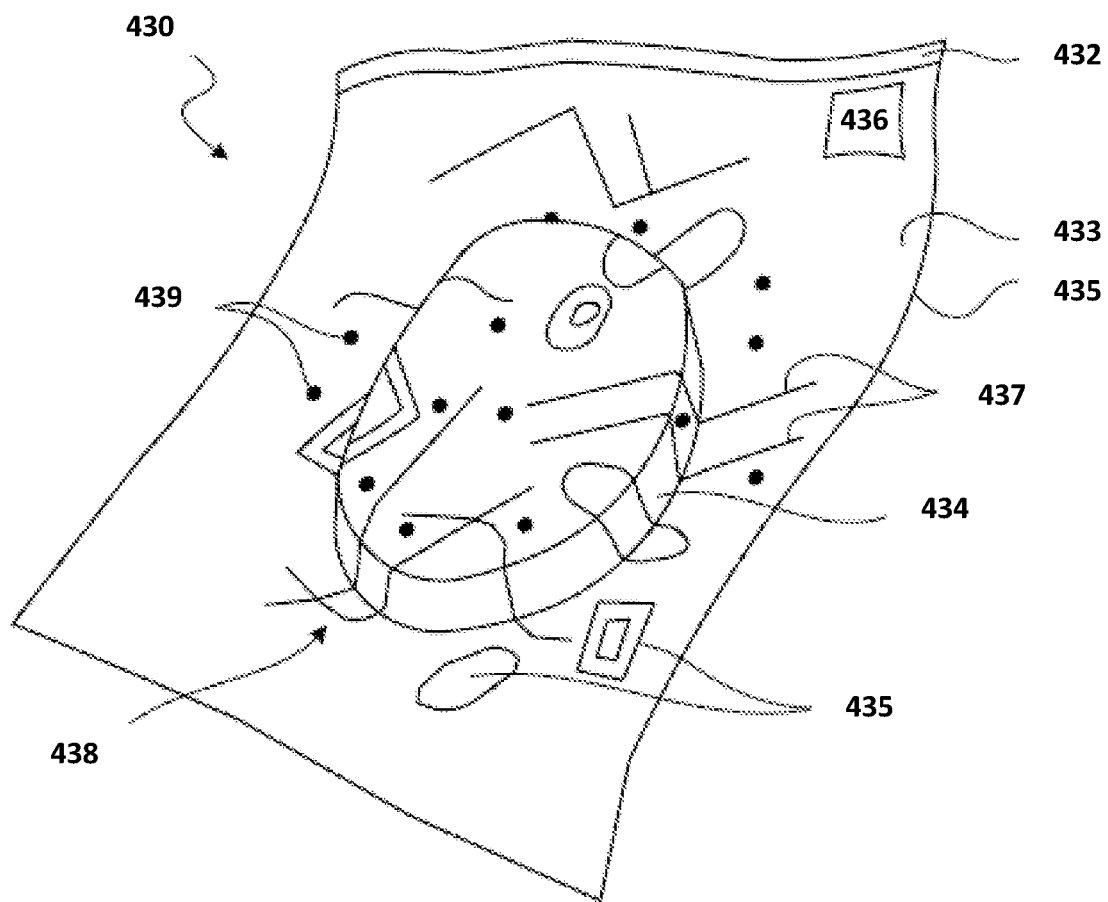
FIG. 4B is a perspective view of the storage bag of FIG. 4A with a food item disposed therein.

FIG. 4A is a top view of an alternative storage bag 430. FIG. 4B is a perspective view of the alternative storage bag 430 of illustrated in FIG. 4A with a food item 434 disposed therein. For the purposes of clarity, features of storage bag 330 which are shared with storage bag 430 include a reference number incremented by 100. As shown, the storage bag 430 includes indicia which can be provided in the form of a pattern 438 printed on or otherwise affixed to a first (i.e. top) surface of the storage bag 430. The indicia 438 can be printed on the storage bag 430 alternatively or in addition to a QR or other machine-readable identifier (not shown). In some embodiments, a larger indicia can be formed on a roll of material from which the storage bag 430 is cut, and the indicia 438 can be a portion or subsection of the larger indicia. In the illustrated embodiment, the indicia 438 comprises an irregular arrangement of shapes 435, lines 437, and/or dots 439 that can be used to uniquely identify the storage bag 430. In other embodiments, the pattern 438 can include any combination of shapes, lines, dots, etc., that distinguish the storage bag 430 from one or more other storage bags. As described in detail below, in some embodiments a user can capture an image of the indicia 438 on the storage bag 430 via a user device (e.g., a camera of a smartphone or tablet). The user can then enter information about the food item 434 into the user device (e.g., via an application running thereon) that can be associated with the storage bag 430, as uniquely identified by the indicia 438.

In some embodiments, the indicia 438 can be configured to enable estimations of various characteristics of the food item 434. In particular, placing the food item 434 inside the storage bag 430 distorts the pattern 438 relative to when the storage bag 430 is laid flat. Positioning the food item 434 in the bag 430 causes the first surface 433 of the bag 30 to be generally non-planar—which distorts the indicia 436 from the planar indicia illustrated in FIG. 4A. Optionally, the user can place the bag 430 in a vacuum device to remove air from the bag 430, or could manually remove some air from the bag 430 before sealing it. This distortion can provide information about characteristics of the food item 434 such as, for example, a thickness, volume, shape, or mass of the food item 434. Likewise, if the storage bag 430 is clear, the color, size, position, shape, etc., of the food item 434 in the storage bag 430 can provide information about the characteristics of the food item 434 in addition to or alternatively to any distortion of the pattern 438. For example, a position of the food item 434 relative to the pattern 438—even if the storage bag 430 is not pulled tight around the food item 434—can provide information about the size (e.g., shape, volume, thickness, etc.) or weight of the food item 434. Even when the storage bag 430 is opaque and is not pulled tight around the food item 434, distortion of the pattern 438 from the food item 434 can provide information that permits accurate estimation of the thickness and shape of the food item 434. More particularly, in some embodiments the storage bag 430 can be the same as or similar to any of the sous vide bags described in detail in U.S. Provisional Patent Application No. 62/768,776, filed 16 Nov. 2018, and titled "METHODS FOR ESTIMATING CHARACTERISTICS OF FOOD ITEMS PLACED IN BAGS, SUCH AS FOR USE IN SOUS VIDE COOKING," and International Patent Application No. PCT/M2019/059815, filed 15 Nov. 2019, and titled "ESTIMATING A CHARACTERISTIC OF A FOOD ITEM".

In the illustrated embodiment of FIGS. 4A and 4B, the indicia 438 is positioned on the first surface 233 of the bag 30 such that it generally overlays or is superimposed over the food item 434. In other embodiments, the indicia 438 can comprise another regular pattern and can extend over more or less of the first surface 433 of the bag 434. For example, the pattern 438 could extend to the sides of the bag 430 and thus cover the entire first surface 433. In the embodiment illustrated in FIG. 4, the bag 430 can also include further indicia (not pictured) on a second surface 435 (FIG. 4) that is opposite to the first surface 433. The indicia on the first and second surfaces 433, 435 of the bag can have different colors such that they are distinguishable in an image taken of the bag 430. The indicia 438 on the first surface 433 and/or the indicia on the second surface 435 can be used/imaged to provide information about the food item 434.

In the illustrated embodiments of FIGS. 3 and 4A, the bag 330, 430 is formed of a clear or transparent material such that the food item 334, 434 is visible within the bag 330, 430. Alternatively, the bag 330, 430 can be formed of a different material such that the food item 334, 434 is not visible within the bag 30.

Figure 5:
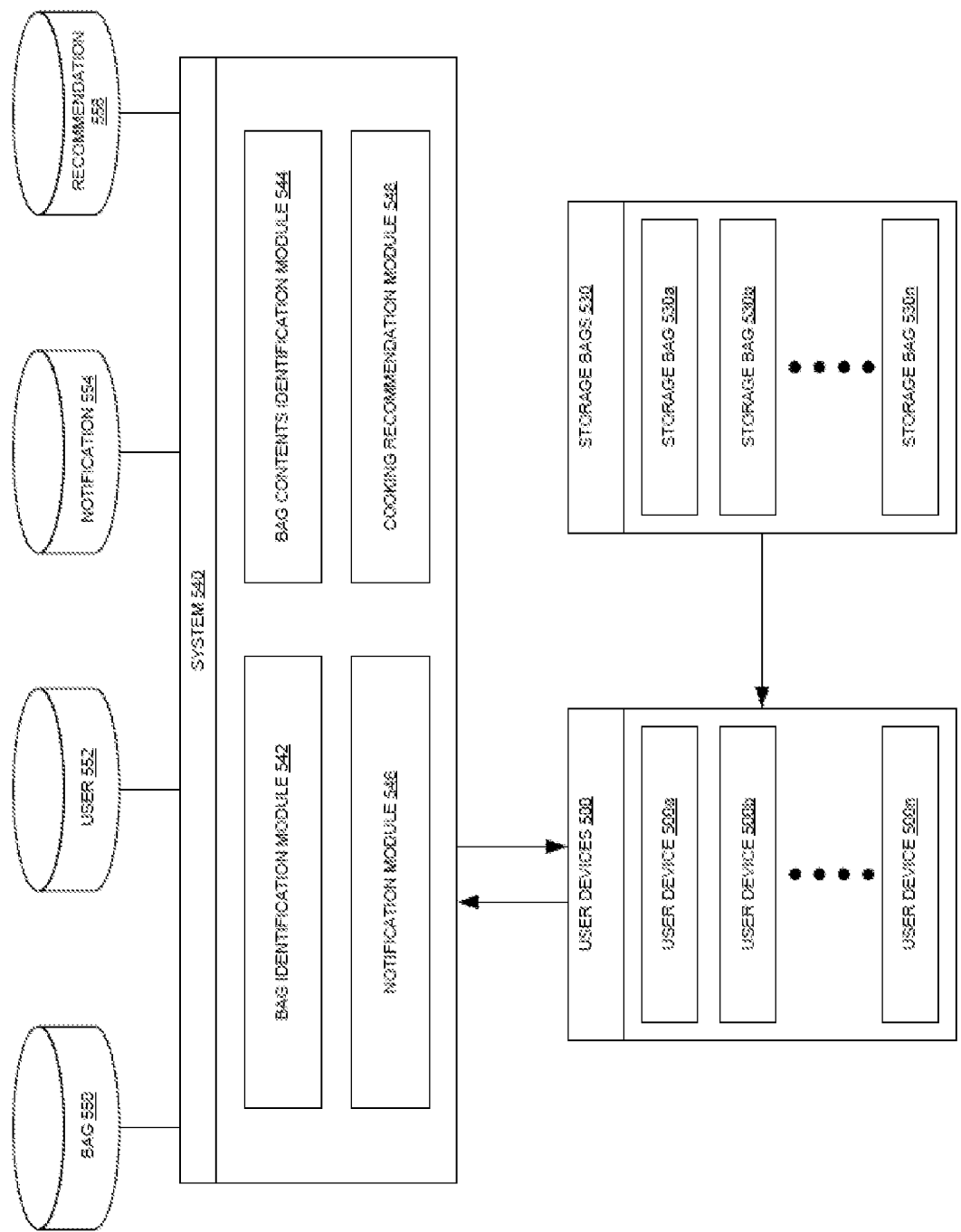
FIG. 5 is a schematic illustration of an example of a food storage system.

III. Selected Embodiments of Systems for Sharing Data of Storage Bag Contents with External Devices FIG. 5 is a block diagram of a suitable food storage system 540 ("system 540") for sharing information/data about the contents of storage bags or containers with external devices. The system 540 can operate to track/record data about the contents of multiple storage containers or storage bags. While certain aspects of the operation of the system 540 are described below in the context of storing food items within storage bags (e.g., plastic pouches), one skilled in the art will understand that the system 540 is configured to operate with respect to many different types of storage vessels capable of storing many different types of items. Moreover, the system 540 can operate on or among the user devices 100 and 200 and/or other devices, systems, etc., and it may be distributed among such devices and, for example, the server computing devices 224 and 226, as described in detail above with reference to FIGS. 1 and 2.

In the illustrated embodiment, the system 540 is configured to receive data from user devices 500 (e.g., via an application running on the user devices 500) about/related to storage bags 530 (e.g., the storage bags 330 and/or 430 shown in FIGS. 3, 4A and 4B) and contents—e.g., food items—disposed within the storage bags 530. The data about the storage bags 530 can include data that uniquely identifies individual ones of the storage bags 530. For example, the user devices 500 can capture image data of the storage bags 530 (e.g., including image data about a unique indicia on the bag), read/scan QR codes on the storage bags 530, read RFID tags embedded in the storage bags 530, etc. At the same time, the user devices 500 can receive one or more user inputs providing information about the food items stored within the storage bags 530. The system 540 can then associate the storage bags 530 with the food items disposed therein. At some later date, the system 540 can display data about the food item stored within a particular one of the storage bags 530 when, for example, a user scans, photographs, etc., the particular one of the storage bags 530. The system 540 can further operate to provide reminders, recommendations, or other prompts regarding using (e.g., cooking) the contents in the storage bags 540.

More specifically, the system 540 can include a bag identification module 542, a bag contents identification module 544, a notification module 546, and a cooking recommendation module 548. The system 540 can read, store, and/or access data from a bag and bag contents ("bag") database 550, a user database 552, a notification database 554, and a recommendation database 556. Other databases, not shown, can be connected to the system 540. Also, while the databases are shown separately, the databases can be integrated into fewer databases or data structures (e.g., a single database or unified data structure).

The bag identification module 542 is configured to receive data from the user devices 500 about the storage bags 530 to uniquely identify the storage bags 530. For example, the user devices 500 can capture images of the storage bags 530 and/or read/scan machine-readable data stored directly on the storage bags 530, such as from QR codes or indicia printed on or otherwise attached to the storage bags 530, radio-frequency identification (RFID) or near-field communication (NFC) chips or tags embedded in or otherwise attached to the storage bags 530, etc. If the storage bag 530 has not previously been scanned, the bag identification module 542 can update the bag database 550 to add the newly scanned/identified storage bag 530. As described in greater detail below, if the storage bag 530 has previously been scanned, the bag identification module 542 can retrieve data from the bag database 550 about the contents of the storage bag 530.

In one aspect of the present technology, the storage bags 530 need only be uniquely identifiable for individual users. That is, the storage bags 530 do not need to be globally unique but rather locally unique only to a particular storage environment of a user (e.g., uniquely identifiable relative to other ones of the storage bags 530 in the same freezer of the same user). Accordingly, the bag identification module 542 can receive and store data (e.g., in the user database 552) associating the user devices 500 with the specific ones of the storage bags 530 that they have provided data about (e.g., scanned, imaged, etc.).

The bag contents identification module 544 is configured to receive data from the user devices 500 about food items or other contents placed within the storage bags 530. For example, a user can operate one of the user devices 500 to scan a QR code on one of the storage bags 530 in which they have recently placed a food item. Scanning the QR code can automatically open an application running on the user device 500 that prompts the user to enter data about the food item. For example, the user might enter data about the food item such as a type (e.g., beef, chicken, fish, vegetable, sauce, marinade, etc.), a size, a thickness, a weight, an intended storage location (e.g., freezer, refrigerator, etc.), a use-by or cook-by date, a marinade or sauce type, a preferred marinade to use with the food item, a preferred meal or recipe to use the food item in, a cost of the food item, and/or other note or characteristic about the food item. The application running on the user device 500 can provide a GUI that provides dropdown options to select common data fields like food type (beef, fish, etc.), preferred end use (sous vide cooking for a type of fish, pressure cooking for a type of beef), and other data fields. Moreover, identifiers on the storage bags 530 (e.g., the identifier 336 of FIG. 3) can have data encoded therein, like the size of bag, likely later use for bag (sous vide v. slow cooker v. pressure cooker), etc., so that certain storage bags 530 are applicable for use with certain foods, for certain end uses, etc. The bag contents identification module 544 can then update the bag database 550 to associate the storage bag 530 with the data about the food item placed therein. That is, the system 540 can update the bag database 550 to include a record of the particular food items (and characteristic thereof) stored within each of the storage bags 530.

In addition to receiving data from a user regarding bag contents, the bag contents identification module 544 can also automatically determine certain data about food items placed within the storage bags 530. For example, the bag contents identification module 544 can automatically determine a date and time that a food item was packaged in one of the storage bags 530 (e.g., a date and time at which the user device 500 scans the storage bag 530). In some embodiments, the bag contents identification module 544 can automatically estimate one or more characteristics of the food item after it is placed in the storage bag 530, such as a shape, thickness, volume, weight, type, quantity, surface heat transfer coefficient, and/or other characteristics of the food item. For example, the system 540 can receive image data from one of the user devices 500 and can process the image data using one or more computer vision algorithms to estimate the one or more characteristics. More specifically, the system 540 can analyze the distortion of a pattern on the storage bag 530 (e.g., the pattern 438 shown in FIG. 4) to estimate the one or more characteristics, as described in detail in U.S.

Provisional Patent Application No. 62/768,776, filed 16 Nov. 2018, and titled "METHODS FOR ESTIMATING CHARACTERISTICS OF FOOD ITEMS PLACED IN BAGS, SUCH AS FOR USE IN SOUS VIDE COOKING," and International Patent Application No. PCT/M2019/059815, filed 15 Nov. 2019, and titled "ESTIMATING A CHARACTERISTIC OF A FOOD ITEM" which are both incorporated herein by reference in their entirety. For example, the processor of the system 540 can execute the contents estimation module 544 stored in memory which employs one or more computer-vision or augmented-reality algorithms stored in memory to process the image data to determine a location/orientation of the indicia on the bag 430 in three-dimensional (3D) space. The processor of the system 540 can employ algorithms as described in, for example, "*Image Restoration of Arbitrarily Warped Documents,*" Brown, Michael S, and W. Brent Seales, *IEEE Transactions on Pattern Analysis and Machine Intelligence*, vol. 26, no. 10, October 2004, pp. 1295-306, and/or "*A New Approach to Image-Based Estimation of Food Volume,*" Hassannejad et. al., *Algorithms*, vol. 10, no. 2, 10 Jun. 2017.) That is, the processor of the system 540 can estimate/model the 3D shape of the bag 430 based on the distortion of a known indicia on the bag 430. For example, the processor of the system 540 takes known data stored in memory (such as a prior image of the indicia, or a known geometry of the indicia), and compares it with a newly received image of that indicia as distorted by the food item that lies underneath and within the bag 30. That known data can be locally stored in memory of the user device. It will be appreciated by those skilled in the art that other computer vision algorithms can be used. In one form, augmented reality toolkits for the Android™ operating system (ARCore) and Apple™ iOS (ARKit) can be utilised for implementing the computer vision algorithm. Deep neural networks and machine learning techniques can also be used to determine the type of food item (e.g. loin steak vs lamp chop).

The system 540 or user device 500 can additionally be configured to determine one or more characteristics of the food item prior to and/or after removal from the storage bag 530. For example, the system 540 or user device 500 can use a trained image classification model stored in memory and developed using machine learning to determine characteristics the food item such as a shape, thickness, volume, weight, type, quantity and/or other characteristics of the food item. For example, the image classification model can be developed using a neural-network library known as Keras™. In another example, the image classification model can be developed using Tensorflow™. In one form, the user can capture an image of the food item to estimate characteristics regarding the food item using the trained image classification model. The results indicative of one or more characteristics of the food item determined by the trained image classification model are presented to the user for confirmation and/or adjustment. The confirmed characteristics are then stored in association with the identifier as discussed in examples contained in the specification. As such, the estimated characteristics can be used as input data for generating one or more notifications for the storage bag which will contain the food item. Using this technique, the user is not required to enter a number of characteristics of the food item as the trained image classification model is used to automatically estimate these characteristics.

The bag identification module 542 is further configured to retrieve data from the bag database 550 about the contents of the storage bags 530. For example, after packaging one of the storage bags 530 with a particular food item, scanning the storage bag 530, and entering data about the food item, a user may place the storage bag 530 in their freezer, refrigerator, or another suitable location. At some point, the user may not remember certain data about the food item, such as what it is, why they stored it, when it was packaged, etc. Accordingly, the user can rescan the identifier, such as the QR code, on the storage bag 530, take another photograph of the storage bag 530, or otherwise identify the storage bag 530. The bag contents identification module 544 can then match the newly received data about the storage bag 530 to the data about the storage bag 530 previously stored in the bag database 550, and retrieve the associated data about the food item therein. The data about the food item can then be output to the user via one or more of the user devices 500. In this manner, the system 540 facilitates the identification of food items stored within the storage bags 530.

The notification module 546 is configured to provide notifications or reminders to the user devices 500 regarding certain food items, such as a reminder to cook/consume a certain food item before an expiration date or to cook/consume a certain food item within a temporal window for optimal taste and/or texture or prior to an undesired change to taste and/or texture (i.e. freezer burn). The notification module 546 can be configured to generate the notification to be indicative of a cooking recommendation based on the data related to the contents of the storage bag. For example, the cooking recommendation may indicate that the food item in the storage bag should be cooked by a particular date. Additionally or alternatively, the notification module can be configured to generate the notification to be indicative of a consumption recommendation based on the data related to the contents of the storage bag. For example, a food item may have already been cooked and was subsequently frozen. The notification module can be configured to generate the notification to be indicative of a consumption recommendation indicating that the already cooked food item should be cooked by a particular date to reduce the likelihood of the food item being freezer burnt. It will be appreciated that separate or dedicated notifications can be sent for a cooking recommendation and a consumption recommendation. However, in certain examples, the generated notification can include the cooking notification and the consumption recommendation. In some instances, the notification may relate to multiple food items stored in separate storage bags so as to reduce the number of notifications that are sent to the user device(s).

The system 540 can be configured to receive, from the user device 500, input data in relation to the contents of the storage bag. The notification module 546 of the system can be configured to determine, based on the input data, a notification send date to send the notification to the user device. The notification module 546 can be configured to schedule transfer of the notification to the user device 500 on the notification send date. The input data may be input from the user interacting with the input device of the user device 500. However, the input data may be received by the system 540 from other sources. In one form, the input data is received from a computing device of a storage device which stores therein the storage bag. The input data can include temperature data indicative of a storage temperature for the storage bag, wherein the notification send data is determined by the at least one processor further based on the temperature data. In these examples, the storage device is a refrigerator or freezer.

The notifications or reminders can be sent to one or more of the user device(s) 500 prior to cooking of the food item contained in the storage bag 530. In some embodiments, the system 540 can receive a user request for a notification or reminder to be sent at a certain predetermined time and date. For example, the notification module 546 can prompt the user to enter a cook-by-date as part of the data entered about the food item (e.g., at the time of packaging). Additionally or alternatively, the notification module 546 can prompt the user to enter a consume-by-date as part of the data entered about the food item. The notification module 546 can further update the notification database 554 with the cook-by-date and/or consume-by-date and can issue a notification to one of the user devices 500 associated with the user at or before the cook-by-date and/or consume-by-date. The notification can include a picture of the storage bag 530 in which the food item is stored, or other data helpful for identifying the storage bag 530. In some embodiments, the notification can include instructions executable by the user device 500 to update a calendar application running thereon to include/display the cook-by-date.

In some embodiments, the notification module 546 is configured to automatically generate and send notifications based on (i) one or more predefined rules (e.g., rules stored in the notification database 554) and (ii) the data about the contents of the storage bag 530. For example, if the system 540 receives input data that a particular one of the storage bags 530 includes fresh chicken and is stored in a freezer, the system 540 can issue a notification before an estimated freezer lifetime of the chicken expires. In another example, if the system 540 receives input data from the user indicative of a particular one of the storage bags 530 includes fresh chicken and is initially stored in a refrigerator, the system 540 can issue a notification to relocate the storage bag 530 containing the food item to the freezer. Further input data can be received by the system 540 from the user indicative of the relocated location of the storage bag 530 such that a further notification can be set by the notification module 546 in response to the relocated storage bag 530. In each of these examples, the system 540 limits food waste and/or the consumption of food items that may be past their expiration date. In one aspect of the present technology, the system 540 can remind users of food items that they had forgotten when they were first packaged and stored, or even forgotten entirely that they have. The notification module 546 can be configured to additionally receive input data indicative of one or more storage temperatures of the refrigerator or freezer which the storage bag is stored within. For example, the one or more rules can be dependent upon at least some of the input data. For example, the notification generation date may be dependent upon the operating temperature of the refrigerator/freezer device. In one example, a rule used by the notification module 546 causes a notification to be generated and issued to one or more of the user devices within a predetermined period, for example, 14 days of a storage date of a storage bag within a refrigerator operating at or less than a predetermined temperature, for example, 3 degrees Celsius. However, the notification module 546 can be configured to generate and issue a notification to one or more of the user devices within 3 days of the storage date of the storage bag within the refrigerator operating at 5 degrees Celsius. In this example, the refrigerator and/or freezer device include a computing device which is in data communication with the system 540 to provide input data indicative of the operating temperature to allow the notification module to generate the notification at the appropriate notification date.

The cooking recommendation module 548 is configured to provide cooking recommendations based on the data received about the food items stored in the storage bags 530. For example, the cooking recommendation module 548 can receive the data about the type of food item (e.g., as input by the user or automatically determined by the bag contents identification module 544), and compare the data to data stored in the recommendation database 556 to provide a recipe recommendation and/or associated cooking instructions. The recommendation can be in the form of a textual alert, email, pop-up, etc., issued to one or more of the user devices 500. In some embodiments, the cooking recommendation module 548 can compare data about the food items stored within multiple ones of the storage bags 530 and associated with the same user. The cooking recommendation module 548 can then recommend recipes based on the entire inventory of food items associated with the user. For example, if the system 540 determines that the same user has different storage bags 530 containing chicken and lemon garlic sauce in their freezer, the cooking recommendation module 548 could issue a notification to one of the user devices 500 associated with the user including a recipe for a lemon garlic chicken pasta.

In some embodiments, the system 540 can be communicatively coupled to one or more cooking devices, such as refrigerators, stove tops, sous vide cooking devices, pressure cookers, etc. In such embodiments, the cooking recommendation module 548 can provide cooking instructions (e.g., including times, temperatures, etc.) to a cooking device for cooking a food item in one of the storage bags 530.

IV. Selected Embodiments of Processes for Tracking Storage Bag Contents

The present technology enables the tracking of contents (e.g., food items) in storage bags via an application running on a user device. In particular, a user can scan or capture an image of a storage bag using a user device (e.g., mobile phone or tablet) at the time they package a food item into the storage bag, while also providing data about the food item via the user device. The scan or image can provide data that uniquely identifies the storage bag so that, at a later date, the user can rescan or capture another image of the storage bag to retrieve the data about the food item.

Figure 6:
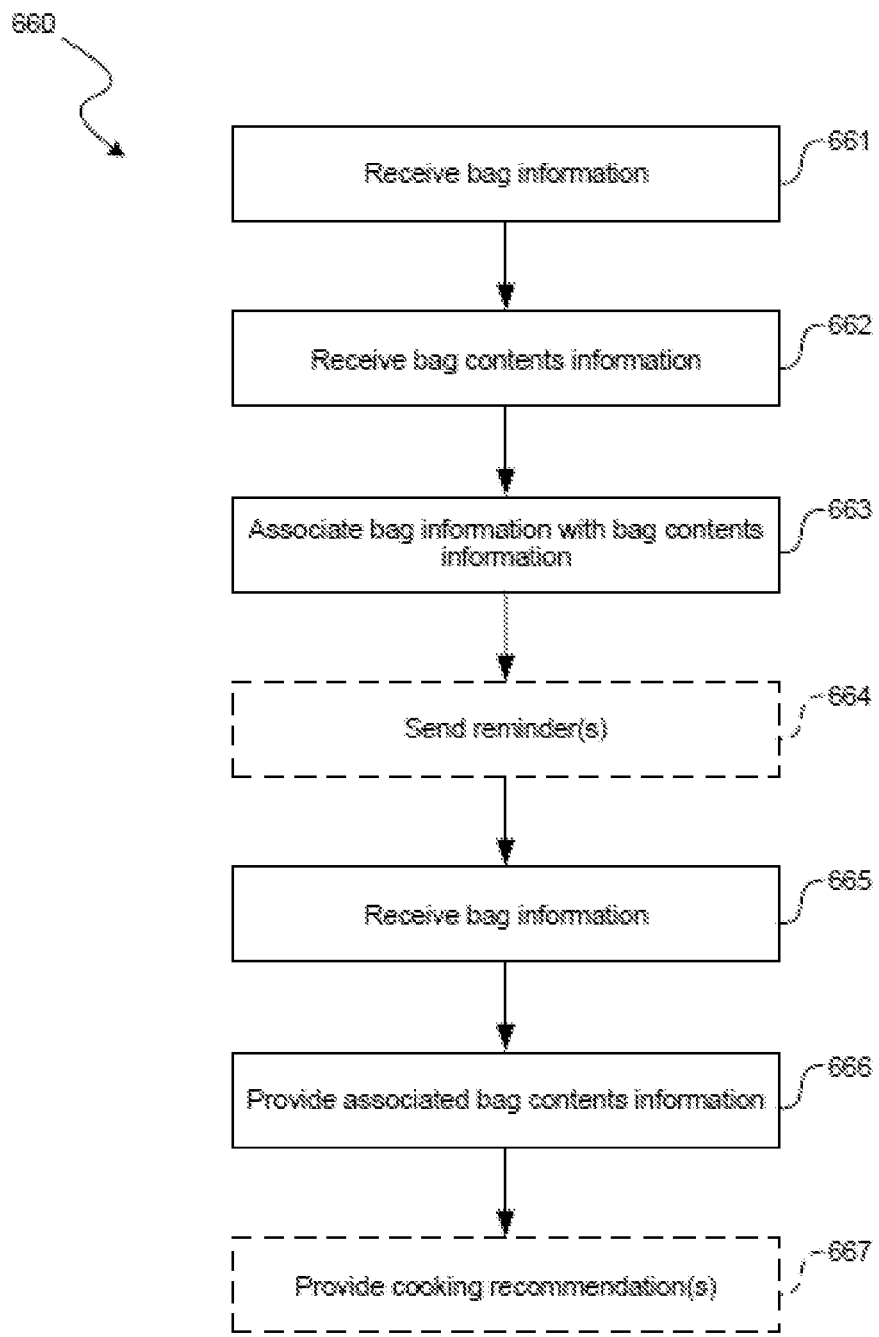
FIG. 6 is a flow diagram of an example of a process or method for tracking storage bag contents.

In particular, the at least one processor of the system 540 can be configured to receive, from the user device, a query request indicative of data uniquely identifying the storage bag having the contents stored therein. The at least one processor of the system 540 can then query a data store using the data uniquely identifying the storage bag to determine the contents of the storage container. The at least one processor of the system 540 can be configured to send, to the user device, data indicative of the contents of the storage container. More particularly, FIG. 6 is a flow diagram of a process or method 660 for tracking storage bag contents. For the sake of illustration, some features of the process 660 will be described in the context of the embodiment shown in FIG. 5.

The method 660 starts at block 661 by receiving data about a storage bag or a storage container from a user device. For example, before, during, or after packaging a food item into a storage bag (e.g., vacuum sealing the food item in a plastic pouch), a user can activate an application running on one of the user devices 500 and subsequently scan a QR code on the storage bag and/or take a picture of the storage bag. In other embodiments, scanning the QR code or imaging the bag can automatically cause the application to run on the user device 500. The machine-readable data associated with the QR code and/or the image data is transmitted to and received by the system 540, which can process the data to uniquely identify the storage bag such that it can be associated with the food item therein and later identified.

At block 662, the method 660 includes receiving data about the contents of the storage bag. For example, the user can enter data about the food item stored in the storage bag via the application running on the user device 500, such as a type, size, thickness, weight, intended storage location, cook-by date, etc. Additionally or alternatively, the system 540 can automatically determine/estimate one or more characteristics of the food item such as a packaging date or time, type, size, etc.

At block 663, the method 660 includes associating the data about the storage bag with the data about the contents of the storage bag. For example, the system 540 can jointly store this data in the bag database 550. Because the data about the storage bag includes data uniquely identifying the storage bag, the data about the food item can be retrieved later by rescanning, reimaging, etc., the storage bag.

At block 664, the method 660 optionally includes sending one or reminders. For example, the system 540 can receive a user-defined reminder date and time (e.g., at block 662) and can generate and send a reminder to the one of the user devices 500 associated with the user at that date and time. Additionally or alternatively, the system 540 can generate and send reminders based on predefined rules and the received data about the food item (e.g., received at block 662). For example, the system 540 can generate and send a notification at an estimated expiration date or best-by date of the food item reminding the user to retrieve and cook the food item.

At block 665, the method 660 includes again retrieving data about the storage bag. For example, a user wishing to determine the contents of a storage bag in their freezer can scan the QR code on the storage bag and/or take a picture of the storage bag. At block 666, the method 660 includes providing the bag contents data associated with the storage bag to the user. For example, the system 540 can compare the QR code and/or image to those stored in the bag database 550, retrieve the food item data associated with the storage bag, and send the food item data to the user device 500 associated with the user. In one example, the user may retrieve a storage bag from their freezer and be unable to remember what food item is in the storage bag, when the food item was packaged, what the food item is marinated in, what meal they had intended to use the food item in, etc. However, by previously entering this data into the system 540 (e.g., at the time of packaging), the system 540 can present the desired data to the user upon rescanning, reimaging, etc., of the storage bag.

At block 667, the method 660 optionally includes providing one or more cooking recommendations to the user. For example, if the user rescans a storage bag containing a steak, the system 540 can provide recommendations for how to season and cook the steak, foods or wines to pair with the steak, or other food items in other storage bags associated with the user that could be used in a meal with the steak. In some embodiments, the system 540 can provide cooking instructions for cooking the food item using a sous vide cooking process.

V. Conclusion

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

These and other changes can be made to the invention in light of the above Detailed Description. While the above description details certain embodiments of the invention and describes the best mode contemplated, no matter how detailed the above appears in text, the invention can be practiced in many ways. Details of the invention may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The invention claimed is:

1. A food storage system, comprising:
at least one processor; and
at least one non-transitory processor-readable medium storing processor-executable instructions that, when executed by the at least one processor, cause the at least one processor to:
receive, from a user device, data related to a storage bag that uniquely identifies the storage bag, wherein the storage bag has indicia printed or affixed to an external surface thereof;
receive, from the user device, data related to contents of the storage bag;
associate the data related to the storage bag with the data related to the contents of the storage bag;

receive image data indicative of the indicia of the storage bag whilst containing the contents;

process the image data to determine a location or distortion of the indicia in three-dimensional (3D) space;

determine one or more characteristics of the contents based at least in part on the location or distortion of the indicia;

generate a notification based on the data related to the contents of the storage bag and the one or more characteristics; and send the notification to the user device.

2. The food storage system of claim 1, wherein the at least one processor is further configured to generate the notification to be indicative of:

a cooking recommendation based on the data related to the contents of the storage bag; and/or a consumption recommendation based on the data related to the contents of the storage bag.

3. The food storage system of claim 1, wherein the data related to the storage bag is indicative of a machine-readable identifier printed on or affixed to the storage bag, wherein the machine-readable identifier is a unique identifier.

4. The food storage system of claim 1, wherein the at least one processor is configured to:

receive, from the user device, a query request indicative of data uniquely identifying the storage bag having the contents stored therein;

query a data store using the data uniquely identifying the storage bag to determine the contents of the storage bag; and send, to the user device, data indicative of the contents of the storage bag.

5. The food storage system of claim 1, wherein the at least one processor is configured to:

receive, from the user device, input data in relation to the contents of the storage bag;

determine, based on the input data, a notification send date to send the notification to the user device; and schedule transfer of the notification to the user device on the notification send date.

6. The food storage system of claim 5, wherein the at least one processor is configured to receive, from a computing device of a storage device which stores therein the storage bag, temperature data indicative of a storage temperature for the storage bag, wherein the notification send date is determined by the at least one processor further based on the temperature data.

7. The food storage system of claim 6, wherein the storage device is a refrigerator or freezer.

8. The food storage system of claim 5, wherein the at least one processor is configured to:

determine the notification send date further based on the one or more characteristics of the contents of the storage bag.

9. The food storage system of claim 8, wherein the at least one processor is configured to process the image data using a computer-vision algorithm.

10. The food storage system of claim 9, wherein the one or more characteristics include at least one of a weight, a thickness, a volume, a shape, and/or a food type, wherein the contents of the storage bag is one or more food items.

11. A method for operating a food storage system, wherein the method includes:

receiving, from a user device, data related to a storage bag that uniquely identifies the storage bag, wherein the storage bag has indicia printed or affixed to an external surface thereof;

receiving, from the user device, data related to contents of the storage bag;

associating the data related to the storage bag with the data related to the contents of the storage bag;

receiving image data indicative of the indicia of the storage bag whilst containing the contents;

processing the image data to determine a location or distortion of the indicia in three-dimensional (3D) space;

determining one or more characteristics of the contents based at least in part on the location or distortion of the indicia;

generating a notification based on the data related to the contents of the storage bag and the one or more characteristics; and sending the notification to the user device.

12. The method of claim 11, wherein the method further comprises generating the notification to be indicative of:

a cooking recommendation based on the data related to the contents of the storage bag; and/or a consumption recommendation based on the data related to the contents of the storage bag.

13. The method of claim 12, wherein the method further comprises:

receiving, from the user device, a query request indicative of data uniquely identifying the storage bag having the contents stored therein;

querying a data store using the data uniquely identifying the storage bag to determine the contents of the storage bag; and sending, to the user device, data indicative of the contents of the storage bag.

14. The method of claim 11, wherein the data related to the storage bag is indicative of a machine-readable identifier printed on or affixed to the storage bag, wherein the machine-readable identifier is a unique identifier.

15. The method of claim 11, wherein the method further comprises:

receiving, from the user device, input data in relation to the contents of the storage bag;

determining, based on the input data, a notification send date to send the notification to the user device; and scheduling transfer of the notification to the user device on the notification send date.

16. The method of claim 15, wherein the method further comprises receiving, from a computing device of a storage device which stores therein the storage bag, temperature data indicative of a storage temperature for the storage bag, wherein the notification send data is determined further based on the temperature data.

17. The method of claim 16, wherein the storage device is a refrigerator or freezer.

18. The method of claim 15, wherein the method further comprises:

determining the notification send date further based on the one or more characteristics of the contents of the storage bag.

19. The method of claim 18, wherein the method further comprises processing the image data using a computer-vision algorithm.

20. The method of claim 19, wherein the one or more characteristics include at least one of a weight, a thickness, a volume, a shape, and/or a food type, wherein the contents of the storage bag is one or more food items.

* * * * *